(12) United States Patent
Zhang

(10) Patent No.: US 11,261,322 B2
(45) Date of Patent: Mar. 1, 2022

(54) YAW BRAKE LINING AND METHOD OF PRODUCING THE SAME

(71) Applicants: FORDA ENERGY UK LIMITED, London (GB); Pengfei Zhang, Inner Mongolia (CN)

(72) Inventor: Pengfei Zhang, Inner Mongolia (CN)

(73) Assignee: FORDA ENERGY UK LIMITED, London (GB)

( * ) Notice: Subject to any disclaimer, the term of this patent is extended or adjusted under 35 U.S.C. 154(b) by 256 days.

(21) Appl. No.: 16/623,711

(22) PCT Filed: Apr. 9, 2018

(86) PCT No.: PCT/CN2018/082398
§ 371 (c)(1),
(2) Date: Dec. 17, 2019

(87) PCT Pub. No.: WO2018/233350
PCT Pub. Date: Dec. 27, 2018

(65) Prior Publication Data
US 2021/0139695 A1    May 13, 2021

(30) Foreign Application Priority Data

Jun. 20, 2017 (CN) .......................... 201710470330.0

(51) Int. Cl.
*C08L 67/02* (2006.01)
(52) U.S. Cl.
CPC ......... *C08L 67/02* (2013.01); *C08L 2205/025* (2013.01); *C08L 2205/035* (2013.01)
(58) Field of Classification Search
None
See application file for complete search history.

(56) References Cited

U.S. PATENT DOCUMENTS

2018/0179376 A1* 6/2018 Liu .................... C08K 3/013

FOREIGN PATENT DOCUMENTS

| CN | 102325834 A | 1/2012 |
|---|---|---|
| CN | 103254580 A | 8/2013 |
| CN | 103408889 A | 11/2013 |
| CN | 103709659 A | 4/2014 |
| CN | 104341726 A | 2/2015 |
| CN | 104693696 A | 6/2015 |
| CN | 105440450 A | 3/2016 |
| CN | 107189370 A | 9/2017 |
| EP | 1939446 A2 | 7/2008 |
| JP | S63317548 A | 12/1988 |
| JP | 2004244539 A | 9/2004 |
| WO | 2013148933 A1 | 10/2013 |
| WO | WO 2018/148171 * | 8/2018 |

OTHER PUBLICATIONS

International Search Report from PCT/CN2018/082398 dated Jul. 16, 2018, pp. 3.
Chinese First Office Action from CN201710470330 dated Feb. 9, 2018, pp. 7.
Extended European Search Report issued by European Patent Office dated Mar. 14, 2019 in EP App. No. 18735490.7 (4 pages).
Office Action issued by European Patent Office dated Apr. 4, 2019 in EP App. No. 18735490.7 (4 pages).
Office Action issued by European Patent Office dated Nov. 12,2 019 in EP App. No. 18735490.7 (4 pages).
Notification of Intention to Grant issued by European Patent Office dated Mar. 10, 2021 in EP App. No 18735490.7 (21 pages).

* cited by examiner

*Primary Examiner* — Robert T Butcher
(74) *Attorney, Agent, or Firm* — Nelson Mullins Riley & Scarborough LLP; Reza Mollaaghababa; Andrew W. Schultz

(57) ABSTRACT

Provided are a yaw brake lining and a method of producing the same, which relate to the technical field of macromolecular material. The yaw brake lining is mainly prepared from, by weight, the following ingredients: 40-50 parts of polyethylene terephthalate, 5-10 parts of polybutylene terephthalate, 5-10 parts of polytrimethylene terephthalate, 20-30 parts of glass fiber, 1-3 parts of anti-wear agent, 1-5 parts of lubricant, 1-3 parts of antioxidant and 1-3 parts of coupling agent. It achieves the technical effect that the brake disc is protected from damage due to its direct collision with the metal material during braking, and thus effectively guarantees the braking effect of the yaw brake.

20 Claims, No Drawings

YAW BRAKE LINING AND METHOD OF PRODUCING THE SAME

CROSS REFERENCE TO RELATED APPLICATION

This Application is a U.S. National Phase Application of International Application No. PCT/CN2018/082398, filed on Apr. 9, 2018, which claims the priority to the Chinese Patent Application (No. 201710470330.0), entitled "偏航制动器隔衬垫及其制备方法", filed with SIPO on Jun. 20, 2017, the entirety of which is incorporated herein by reference.

TECHNICAL FIELD

The present disclosure relates to the technical field of macromolecular material, and particularly to a yaw brake lining (i.e. a lining for yaw brake) and a method of producing the same.

BACKGROUND ART

With the advancement of the science and technology and the rapid development of economy, the demand of human beings for electric power continuously expands. Using non-renewable energy sources like coal and petroleum for power generation is confronted with an awkward situation that resources become increasingly poor. As a green energy, wind energy does not only coincide with the international energy reform, but also is a renewable resource, and it also bears positive significance to environment protection, and thus has been drawing the attention from more and more countries.

In the process of the power generation of a wind driven generator, the blades of the wind driven generator need to be redirected as the wind direction changes and be fixed to facing the direction of the optimal wind force, so as to maximize the work efficiency of the wind driven generator. Reorienting the blades of a wind driven generator is realized by a yaw brake which enables the brake control by making the brake pad tightly press the brake disc. However, when a yaw brake is braking, it is very likely for the brake disc to come into collision with the metal part(s) on a side of the brake pad, causing serious damage to the brake disc and compromising the braking effect of the yaw brake.

In view of this, the present disclosure is hereby proposed.

SUMMARY OF THE DISCLOSURE

One of the purposes of the present disclosure is to provide a yaw brake lining to alleviate the technical problem that when a yaw brake is braking, it is very likely for the brake disc to come into collision with the metal part(s) on a side of the brake pad, causing serious damage to the brake disc and compromising the braking effect of the yaw brake.

The yaw brake lining provided by the examples of the present disclosure is mainly prepared from, by weight, the following ingredients: 40-50 parts of polyethylene terephthalate, 5-10 parts of polybutylene terephthalate, 5-10 parts of polytrimethylene terephthalate, 20-30 parts of glass fiber, 1-3 parts of anti-wear agent, 1-5 parts of lubricant, 1-3 parts of antioxidant and 1-3 parts of coupling agent.

Further, the above yaw brake lining is mainly prepared from, by weight, the following ingredients: 42-48 parts of polyethylene terephthalate, 5-10 parts of polybutylene terephthalate, 5-10 parts of polytrimethylene terephthalate, 22-28 parts of glass fiber, 1-3 parts of anti-wear agent, 1-5 parts of lubricant, 1-3 parts of antioxidant and 1-3 parts of coupling agent.

Further, the anti-wear agent is at least one selected from the group consisting of molybdenum disulfide, graphite, ultra-high molecular weight polysiloxane, silicon nitride and boron nitride.

Further, the anti-wear agent is the mixture of molybdenum disulfide, graphite, silicon nitride and ultra-high molecular weight polysiloxane at a mass ratio of (1-2):(1-2):(1-2):(2-4), preferably 1:1:1:2.

Further, the lubricant is at least one selected from the group consisting of low molecular weight polyolefin, stearyl alcohol, silicone or calcium stearate. Preferably, the lubricant is low molecular weight polyolefin.

Further, the coupling agent includes γ-methacryloxy propyl trimethoxysilane and/or γ-2,3-Epoxypropoxy propyltrimethoxysilicane.

Further, the antioxidant is at least one selected from the group consisting of pentaerythritol tetrakis [β-(3,5-di-tert-butyl-4-hydroxyphenyl) propionate], β-(3,5-di-tert-butyl-4-hydroxyphenyl)propionic acid Octester and antioxidant P262.

Further, the main ingredients of the yaw brake lining further include, by weight, 1-3 parts of brightening agent which is titanium dioxide and/or calcium carbonate.

Another purpose of the present disclosure is to provide a method of producing the above yaw brake lining to alleviate the technical problem that when a yaw brake is braking, it is very likely for the brake disc to come into collision with the metal part(s) on a side of the brake pad, causing serious damage to the brake disc and compromising the braking effect of the yaw brake.

The method of producing the yaw brake lining provided by the embodiments of the present disclosure includes the steps of:

(a) mixing the polyethylene terephthalate, polybutylene terephthalate, polytrimethylene terephthalate, glass fiber, anti-wear agent, lubricant, antioxidant, coupling agent and optional brightening agent to obtain an uniform mixture; and (b) performing injection molding on the mixture to produce the yaw brake lining.

Further, the method of producing the yaw brake lining further includes step (s) which is set between step (a) and step (b). In the step (s), the mixture is pelletized through extrusion to obtain mixture granules In the present disclosure, through the synergy among the polyethylene terephthalate, polybutylene terephthalate, polytrimethylene terephthalate, glass fiber, anti-wear agent, lubricant, antioxidant and coupling agent, the yaw brake lining produced thereby has not only excellent tensile property and impact resistance property, but also a high heat deformation temperature and a low friction coefficient, and thus can be fixed on the metal material on the sides of the brake pad of a yaw brake to prevent the brake disc from damages caused by direct collision with the metal material during braking, and thereby guarantee the braking effect of the yaw brake.

The method of producing the yaw brake lining provided by the embodiment of the present disclosure is easy to practice and can be done consecutively, and this significantly improves the efficiency of and lowers the cost of producing the yaw brake lining.

DETAILED DESCRIPTION OF EMBODIMENTS

Now the embodiments of the present disclosure will be described in detail with reference to examples. But those skilled in the art will appreciate that the following examples are used only to illustrate the present disclosure, and thus should not be construed as limiting the scope of the present disclosure. Examples for which no specific condition is indicated should be done under conventional conditions or as recommended by the manufacturer. All those reagents or instruments for which no manufacturer is indicated are all conventional products which are commercially available.

According to one aspect of the present disclosure, the embodiments of the present disclosure provide a yaw brake lining which is mainly prepared from, by weight, the following ingredients: 40-50 parts of polyethylene terephthalate (PET), 5-10 parts of polybutylene terephthalate (PBT), 5-10 parts of polytrimethylene terephthalate (PTT), 20-30 parts of glass fiber, 1-3 parts of anti-wear agent, 1-5 parts of lubricant, 1-3 parts of antioxidant and 1-3 parts of coupling agent.

In the present disclosure, through the synergy among the polyethylene terephthalate, polybutylene terephthalate, polytrimethylene terephthalate, glass fiber, anti-wear agent, lubricant, antioxidant and coupling agent, the yaw brake lining produced thereby has not only excellent tensile property and impact resistance property, but also a high heat deformation temperature and a low friction coefficient, and thus can be fixed on the metal material on the sides of the brake pad of a yaw brake to prevent the brake disc from damages caused by direct collision with the metal material during braking, and thereby guarantee the braking effect of the yaw brake.

In the present disclosure, typically but not limitedly, the polyethylene terephthalate accounts for, by weight, 40.5, 41, 41.5, 42, 42.5, 43, 43.5, 44, 44.5, 45, 45.5, 46, 46.5, 47, 47.5, 48, 48.5, 49 or 49.5 parts.

Polyethylene terephthalate has a highly symmetrical molecular structure, is capable of crystallization orientation to a certain extent, and has a good optical property and weather resistance, along with fine wear resistance, dimensional stability and electrical insulation.

Typically but not limitedly, the polybutylene terephthalate accounts for, by weight, 5.2, 5.4, 5.6, 5.8, 6, 6.2, 6.4, 6.6, 6.8, 7, 7.2, 7.4, 7.6, 7.8, 8, 8.2, 8.4, 8.6, 8.8, 9, 9.2, 9.4, 9.6 or 9.8 parts.

Polybutylene terephthalate is an engineering plastic with fine overall performance. It has fine high-temperature tolerance, corrosion resistance, irradiation resistance, flame retardance, balanced physical and mechanical properties, excellent dimensional stability and fine electrical properties.

Typically but not limitedly, the polytrimethylene terephthalate accounts for, by weight, 5.2, 5.4, 5.6, 5.8, 6, 6.2, 6.4, 6.6, 6.8, 7, 7.2, 7.4, 7.6, 7.8, 8, 8.2, 8.4, 8.6, 8.8, 9, 9.2, 9.4, 9.6 or 9.8 parts.

Polytrimethylene terephthalate is a new polyester fiber material and thermoplastic polyester material with excellent performance. It has outstanding elastic recovery and unique tensile and fatigue resistance performance. Besides, it has the fine properties of both polyethylene terephthalate and polybutylene terephthalate, that is, its strength, hardness and heat deformation temperature are comparable with polyethylene terephthalate, and its processing properties (e.g. melting temperature, processing temperature and molding cycle) are similar to polybutylene terephthalate.

Typically but not limitedly, the glass fiber accounts for, by weight, 20.5, 21, 21.5, 22, 22.5, 23, 23.5, 24, 24.525, 25.5, 26, 26.5, 27, 27.5, 28, 28.5, 29 or 29.5 parts.

Glass fiber is an excellent inorganic non-metallic material which has good insulating property, heat resistance, corrosion resistance, high mechanical strength, incombustibility, and sound insulation. It is mainly composed of silicon dioxide, aluminum oxide, calcium oxide, boron oxide, magnesium oxide and sodium oxide, etc.

In the present disclosure, the glass fiber is a continuous glass fiber having a diameter of 10-15 μm, preferably 10-12 μm.

Typically but not limitedly, the anti-wear agent accounts for, by weight, 1.1, 1.2, 1.3, 1.4, 1.5, 1.6, 1.7, 1.8, 1.9, 2, 2.1, 2.2, 2.3, 2.4, 2.5, 2.6, 2.7, 2.8 or 2.9 parts.

In a preferred embodiment of the present disclosure, the anti-wear agent is at least one selected from the group consisting of molybdenum disulfide, graphite, ultra-high molecular weight polysiloxane, silicon nitride and boron nitride.

Molybdenum disulfide is black solid powder with metallic luster. It has a melting point of 1185° C., a density of 4.80 g/cm, and Mohs hardness of 1.0-1.5. It starts to decompose at 1370° C., and decomposes into molybdenum and sulfur at 1600° C. Molybdenum disulfide is not water soluble, but only soluble in aqua regia and boiled concentrated sulfuric acid. Molybdenum sulfide is used as an ingredient of the friction material because molybdenum sulfide reduces wear when it is at a cold temperature, and increases wear when it is at a hot temperature, and molybdenum sulfide also prevents other ingredients from being oxidized.

In a preferred embodiment of the present disclosure, molybdenum disulfide is of 1000-2500 mesh.

Graphite is soft and has good chemical stability, corrosion resistance and thermal conductivity.

In a preferred embodiment of the present disclosure, the graphite is of 1000-2500 mesh.

Ultra-high molecular weight polysiloxane refers to polysiloxane having a molecular weight greater than 100,000, preferably polysiloxane having a molecular weight ranging from 100,000 to 1 million.

Silicon nitride is an important structural ceramic material and a superhard substance. It is lubricant per se and wear-resistant. It is atomic crystal an thus resists to oxidation at a high temperature and can withstand cold and thermal shock.

Boron nitride is a crystal consisting of nitrogen atoms and boron atoms which account for 56.4% and 43.6% respectively. It is highly lubricant and high-temperature tolerant.

In a preferred embodiment of the present disclosure, the anti-wear agent is the mixture of molybdenum disulfide, graphite, ultra-high molecular weight polysiloxane and silicon nitride at a mass ratio of (1-2):(1-2):(1-2):(2-4), preferably 1:1:1:2.

In a preferred embodiment of the present disclosure, molybdenum disulfide, graphite, ultra-high molecular weight polysiloxane and silicon nitride at a certain mass ratio synergize, so that the produced anti-wear agent has not only excellent lubricity, but also excellent high-temperature tolerance and dimensional stability.

In the present disclosure, typically but not limitedly, the lubricant accounts for, by weight, 1.2, 1.4, 1.6, 1.8, 2, 2.2, 2.4, 2.6, 2.8, 3, 3.2, 3.4, 3.6, 3.8, 4, 4.2, 4.4, 4.6 or 4.8 parts.

In a preferred embodiment of the present disclosure, the lubricant is at least one selected from the group consisting of low molecular weight polyolefin, stearyl alcohol, silicone or calcium stearate. Preferably, the lubricant is low molecular weight polyolefin.

In a preferred embodiment of the present disclosure, the low molecular weight polyolefin refers to low molecular weight polyethylene, polypropylene and the halides thereof, with a molecular weight ranging from 500 to 5000.

Low molecular weight polyolefin is used as the lubricant because it can be well compatible with other resins and has good plasticization and lubrication effects as well.

In the present disclosure, typically but not limitedly, the coupling agent accounts for, by weight, 1.1, 1.2, 1.3, 1.4, 1.5, 1.6, 1.7, 1.8, 1.9, 2, 2.1, 2.2, 2.3, 2.4, 2.5, 2.6, 2.7, 2.8 or 2.9 parts.

In a preferred embodiment of the present disclosure, the coupling agent includes γ-methacryloxy propyl trimethoxysilane and/or γ-2,3-Epoxypropoxy propyltrimethoxysilicane.

In the present disclosure, coupling agent is added to improve the interface performance between the macromolecular resin and the reinforcing material as well as inorganic filler, and to improve the processing property, so that the yaw brake lining provided by the present disclosure can obtain outstanding surface quality and mechanical and thermal properties.

In the present disclosure, typically but not limitedly, the antioxidant accounts for, by weight, 1.1, 1.2, 1.3, 1.4, 1.5, 1.6, 1.7, 1.8, 1.9, 2, 2.1, 2.2, 2.3, 2.4, 2.5, 2.6, 2.7, 2.8 or 2.9 parts.

In a preferred embodiment of the present disclosure, the antioxidant is at least one selected from the group consisting of pentaerythritol tetrakis [β-(3,5-di-tert-butyl-4-hydroxyphenyl) propionate], β(3,5-di-tert-butyl-4-hydroxyphenyl) propionic acid Octester and antioxidant P262.

Antioxidant is added to the main ingredients of the yaw brake lining to delay or inhibit the course of oxidation of polymer, slowing the ageing of the polymer, and thus to extend its service life.

In a preferred embodiment of the present disclosure, the main ingredients of the yaw brake lining further include, by weight, 1-3 parts of brightening agent which is titanium dioxide and/or calcium carbonate.

In the present disclosure, typically but not limitedly, the brightening agent accounts for, by weight, 1.1, 1.2, 1.3, 1.4, 1.5, 1.6, 1.7, 1.8, 1.9, 2, 2.1, 2.2, 2.3, 2.4, 2.5, 2.6, 2.7, 2.8 or 2.9 parts.

In a preferred embodiment of the present disclosure, adding brightening agent into the main ingredients of the yaw brake lining, on the one hand, can improve the appearance of the yaw brake lining, and on the other hand, can also lower the cost of the yaw brake lining.

According to another aspect of the present disclosure, the embodiments of the present disclosure further provide a method of producing the above yaw brake lining, which includes the steps of:

(a) mixing the polyethylene terephthalate, polybutylene terephthalate, polytrimethylene terephthalate, glass fiber, anti-wear agent, lubricant, antioxidant, coupling agent and optional brightening agent to obtain an uniform mixture; and (b) performing injection molding on the mixture to produce the yaw brake lining.

The method of producing the yaw brake lining provided by the embodiments of the present disclosure is easy to practice and can be done consecutively, and this significantly improves the efficiency of and lowers the cost of producing the yaw brake lining.

In a preferred embodiment of the present disclosure, the method of producing the yaw brake lining further includes step (s) which is set between step (a) and step (b). In the step (s), the mixture is pelletized through extrusion to obtain mixture granules.

The main ingredients of the yaw brake lining are pelletized through extrusion, to obtain mixture granules, and then injection molding is performed on the produced mixture granules. In this way, these ingredients are well mixed, so that the produced yaw brake lining will have better and more stable performance.

In a preferred embodiment of the present disclosure, an injection molding machine is used to perform the injection molding.

The mixed ingredients are extruded by a double-screw extruder after being melted and plastified by it, then the melted extrudate is subjected to the injection molding by an injection machine.

Using the injection machine for injection molding leads to high production efficiency and yield, low processing cost, and makes it easier to put into large scale industrial production.

To provide a better understanding of the present disclosure, now the present disclosure will be further described with reference to the examples.

Example 1

The present example provided a yaw brake lining which was prepared from the following ingredients: 40 parts of polyethylene terephthalate, 10 parts of polybutylene terephthalate, 10 parts of polytrimethylene terephthalate, 30 parts of glass fiber, 3 parts of anti-wear agent, 4 parts of lubricant, 1 part of antioxidant, 1 part of coupling agent, and 1 part of brightening agent. Specifically, the anti-wear agent was the mixture of molybdenum disulfide, graphite, silicon nitride and ultra-high molecular weight polysiloxane at a mass ratio of 1:2:2:4, the lubricant was polyethylene with a molecular weight of 1500, the antioxidant was antioxidant P262, the coupling agent was γ-methacryloxy propyl trimethoxysilane, and the brightening agent was titanium dioxide.

Example 2

The present example provided a yaw brake lining which was prepared from the following ingredients: 50 parts of polyethylene terephthalate, 5 parts of polybutylene terephthalate, 8 parts of polytrimethylene terephthalate, 20 parts of glass fiber, 3 parts of anti-wear agent, 5 parts of lubricant, 3 part of antioxidant, 3 part of coupling agent and 3 part of brightening agent. Specifically, the anti-wear agent was the mixture of molybdenum disulfide, graphite, silicon nitride and ultra-high molecular weight polysiloxane at a mass ratio of 2:2:2:3, the lubricant was polypropylene with a molecular weight of 1000, the antioxidant was pentaerythritol tetrakis [β-(3,5-di-tert-butyl-4-hydroxyphenyl) propionate], the coupling agent was γ-2,3-Epoxypropoxy propyltrimethoxysilicane, and the brightening agent was calcium carbonate.

Example 3

The present example provided a yaw brake lining which was prepared from the following ingredients: 42 parts of polyethylene terephthalate, 8 parts of polybutylene terephthalate, 10 parts of polytrimethylene terephthalate, 28 parts of glass fiber, 2 parts of anti-wear agent, 3 parts of lubricant, 2 parts of antioxidant, 3 parts of coupling agent, 2 parts of brightening agent. Specifically, the anti-wear agent was the mixture of molybdenum disulfide, graphite, silicon nitride and ultra-high molecular weight polysiloxane at a mass ratio of 1:2:1:3, the lubricant is polypropylene with a molecular weight of 2000, the antioxidant was the mixture of pentaerythritol tetrakis [β-(3,5-di-tert-butyl-4-hydroxyphenyl) propionate] and β-(3,5-di-tert-butyl-4-hydroxyphenyl)propionic acid Octester at a mass ratio of 1:1, the coupling agent was the mixture of γ-2,3-Epoxypropoxy propyltrimethoxy-silicane and γ-methacryloxy propyl trimethoxysilane at a mass ratio of 1:2, and the brightening agent was calcium carbonate.

Example 4

The present example provided a yaw brake lining which was prepared from the following ingredients: 48 parts of polyethylene terephthalate, 10 parts of polybutylene terephthalate, 5 parts of polytrimethylene terephthalate, 22 parts of glass fiber, 2 parts of anti-wear agent, 4 parts of lubricant, 3 parts of antioxidant, 3 parts of coupling agent, and 3 parts of brightening agent. Specifically, the anti-wear agent was the mixture of molybdenum disulfide, graphite, silicon nitride and ultra-high molecular weight polysiloxane at a mass ratio of 1:2:1:2, the lubricant was polyethylene with a molecular weight of 1200, the antioxidant was antioxidant P262, the coupling agent was the mixture of γ-2,3-Epoxypropoxy propyltrimethoxysilicane and γ-methacryloxy propyl trimethoxysilane at a mass ratio of 1:1, and the brightening agent was the mixture of calcium carbonate and titanium dioxide at a mass ratio of 1:1.

Example 5

The present example provided a yaw brake lining which was prepared from the following ingredients: 46 parts of polyethylene terephthalate, 8 parts of polybutylene terephthalate, 8 parts of polytrimethylene terephthalate, 26 parts of glass fiber, 2 parts of anti-wear agent, 4 parts of lubricant, 2 parts of antioxidant, 2 parts of coupling agent, and 2 parts of brightening agent. Specifically, the anti-wear agent was the mixture of molybdenum disulfide, graphite, silicon nitride and ultra-high molecular weight polysiloxane at a mass ratio of 1:1:1:2, the lubricant was polyethylene with a molecular weight of 1200, the antioxidant was antioxidant P262, the coupling agent was the mixture of γ-2,3-Epoxypropoxy propyltrimethoxysilicane and γ-methacryloxy propyl trimethoxysilane at a mass ratio of 1:1, and the brightening agent was the mixture of calcium carbonate and titanium dioxide at a mass ratio of 1:1.

Example 6

The present example differs from Example 5 in that the anti-wear agent is the mixture of molybdenum disulfide, graphite, silicon nitride and ultra-high molecular weight polysiloxane at a mass ratio of 4:2:2:1.

Example 7

The present example differed from Example 5 in that no molybdenum disulfide was added to the anti-wear agent.

Example 8

The present example differed from Example 5 in that no graphite was added to the anti-wear agent.

Example 9

The present example differed from Example 5 in that no silicon nitride was added to the anti-wear agent.

Example 10

The present example differed from Example 5 in that no ultra-high molecular weight polysiloxane was added to the anti-wear agent.

Example 11

The present example differed from Example 5 in that the lubricant was silicone.

Example 12

The present example differed from Example 5 in that the lubricant was calcium stearate.

The yaw brake lining provided by Examples 1-12 is made by a method which includes the steps of:

(a) mixing the polyethylene terephthalate, polybutylene terephthalate, polytrimethylene terephthalate, glass fiber, anti-wear agent, lubricant, antioxidant, coupling agent and optional brightening agent to obtain an uniform mixture;

(s) subjecting the mixture to extrusion granulation by an extruder, so as to produce mixture granules; and (b) performing injection molding on the mixture to produce the yaw brake lining.

In step (s), a single-screw extruder or double-screw extruder is used for the extrusion granulation of the mixture at a temperature of 250-270° C.

Comparative Example 1

The present comparative example provided a yaw brake lining which differed from Example 5 in that there were 68 parts of polyethylene terephthalate, 2 parts of polybutylene terephthalate, 3 parts of polytrimethylene terephthalate and 15 parts of glass fiber.

Comparative Example 2

The present comparative example provided a yaw brake lining which differed from Example 5 in that there were 22 parts of polyethylene terephthalate, 15 parts of polybutylene terephthalate, 15 parts of polytrimethylene terephthalate and 35 parts of glass fiber.

Comparative Example 3

The present comparative example differed from Example 5 in that no polybutylene terephthalate was added.

Comparative Example 4

The present comparative Example differed from Example 5 in that no polytrimethylene terephthalate was added.

Comparative Example 5

The present comparative example differed from Example 5 in that no anti-wear agent was added.

Comparative Example 6

The present comparative example differed from Example 5 in that no coupling agent was added.

The method of producing the yaw brake lining provided in comparative examples 1-6 above is the same with Example 5 and thus will not be repeated here.

The yaw brake linings provided by Examples 1-12 and comparative examples 1-6 were tested for tensile strength, breaking elongation, impact strength, heat deformation temperature and friction coefficient. Table 1 shows the results.

TABLE 1

Table of Data of the Tests of Yaw Brake Lining Properties

|  | Tensile strength (MPa) | Breaking elongation (%) | Impact strength (KJ/m$^2$) | Heat deformation temperature (° C.) | Friction coefficient | Wear rate (cm$^3$/J × 10$^{-8}$) |
|---|---|---|---|---|---|---|
| Example 1 | 150.4 | 6.2 | 5.2 | 219 | 0.09 | 0.52 |
| Example 2 | 150.6 | 6.2 | 5.3 | 220 | 0.09 | 0.51 |
| Example 3 | 152.7 | 6.3 | 5.5 | 221 | 0.09 | 0.49 |
| Example 4 | 153.2 | 6.3 | 5.6 | 221 | 0.09 | 0.48 |
| Example 5 | 155.2 | 6.4 | 5.8 | 222 | 0.09 | 0.45 |
| Example 6 | 145.2 | 6.1 | 4.8 | 216 | 0.10 | 0.55 |
| Example 7 | 144.3 | 6.0 | 4.9 | 215 | 0.11 | 0.56 |
| Example 8 | 144.4 | 6.1 | 4.8 | 216 | 0.11 | 0.57 |
| Example 9 | 143.8 | 6.0 | 4.9 | 215 | 0.11 | 0.56 |
| Example 10 | 143.6 | 6.1 | 4.9 | 216 | 0.11 | 0.57 |
| Example 11 | 138.2 | 5.9 | 4.7 | 215 | 0.10 | 0.55 |
| Example 12 | 139.4 | 5.9 | 4.7 | 215 | 0.10 | 0.56 |
| Comparative Example 1 | 128.6 | 5.8 | 4.2 | 214 | 0.11 | 0.84 |
| Comparative Example 2 | 128.8 | 5.8 | 4.1 | 215 | 0.12 | 0.86 |
| Comparative Example 3 | 127.5 | 5.7 | 4.1 | 214 | 0.11 | 0.91 |
| Comparative Example 4 | 125.6 | 5.8 | 4.0 | 215 | 0.12 | 0.92 |
| Comparative Example 5 | 126.2 | 5.8 | 4.1 | 214 | 0.15 | 1.52 |
| Comparative Example 6 | 125.4 | 5.7 | 4.0 | 215 | 0.12 | 1.15 |

As can be seen from the comparison of Examples 1-12 and Comparative Examples 1-6, in the present disclosure, through the synergy among polyethylene terephthalate, polybutylene terephthalate, polytrimethylene terephthalate, glass fiber, anti-wear agent, lubricant, antioxidant and coupling agent, the yaw brake lining produced thereby has not only excellent tensile property and impact resistance property, but also a high heat deformation temperature and a low friction coefficient, and thus can be fixed on the metal material on the sides of the brake pad of a yaw brake to prevent the brake disc from damages caused by direct collision with the metal material during braking, and thereby guarantee the braking effect of the yaw brake.

In addition, it can be seen from the comparison of Examples 1-5 and Examples 6-10, when the anti-wear agent is the mixture of molybdenum disulfide, graphite, silicon nitride and ultra-high molecular weight polysiloxane at a mass ratio of (1-2):(1-2):(1-2):(2-4), the produced yaw brake lining will have better tensile strength and impact strength, higher breaking elongation, better elasticity, smaller friction coefficient, lower wear rate and thus longer service life, and can more possibly prevent the brake disc from being damaged due to its direct collision with the metal material during braking, and thus effectively guarantee the braking effect of the yaw brake. It can be seen from the comparison of Examples 1-5 and Examples 11-12 that when the lubricant is low molecular weight polyolefin, the produced yaw brake lining will have better tensile strength and impact strength, lower breaking elongation, smaller coefficient, lower wear rate and better comprehensive performance.

As last, it should be noted that the above embodiments are provided only to explain the technical solutions of the present disclosure, rather than to limit the present disclosure. Although the present disclosure is described in details with reference to the aforementioned examples, those ordinarily skilled in the art should appreciate that they may still make modifications to the technical solutions contained in those examples, or make equivalent replacements to some or all of the technical features therein. Such modifications or replacements should not depart the essence of the respective technical solutions from the scope of the technical solutions in the examples of the present disclosure.

The invention claimed is:

1. A yaw brake lining, wherein the yaw brake lining is prepared from, by weight, the following ingredients: 40-50 parts of polyethylene terephthalate, 5-10 parts of polybutylene terephthalate, 5-10 parts of polytrimethylene terephthalate, 20-30 parts of glass fiber, 1-3 parts of anti-wear agent, 1-5 parts of lubricant, 1-3 parts of antioxidant and 1-3 parts of coupling agent.

2. The yaw brake lining according to claim 1, wherein the yaw brake lining is prepared from, by weight, the following ingredients: 42-48 parts of polyethylene terephthalate, 5-10 parts of polybutylene terephthalate, 5-10 parts of polytrimethylene terephthalate, 22-28 parts of glass fiber, 1-3 parts of anti-wear agent, 1-5 parts of lubricant, 1-3 parts of antioxidant and 1-3 parts of coupling agent.

3. The yaw brake lining according to claim 1, wherein the anti-wear agent is at least one selected from the group consisting of molybdenum disulfide, graphite, ultra-high molecular weight polysiloxane, silicon nitride and boron nitride.

4. The yaw brake lining according to claim 2, wherein the anti-wear agent is at least one selected from the group consisting of molybdenum disulfide, graphite, ultra-high molecular weight polysiloxane, silicon nitride and boron nitride.

5. The yaw brake lining according to claim 3, wherein the anti-wear agent is a mixture of molybdenum disulfide, graphite, silicon nitride and ultra-high molecular weight polysiloxane at a mass ratio of (1-2):(1-2):(1-2):(2-4).

6. The yaw brake lining according to claim 4, wherein the anti-wear agent is a mixture of molybdenum disulfide, graphite, silicon nitride and ultra-high molecular weight polysiloxane at a mass ratio of (1-2):(1-2):(1-2):(2-4).

7. The yaw brake lining according to claim 1, wherein the lubricant is at least one selected from the group consisting of low molecular weight polyolefin, stearyl alcohol, silicone and calcium stearate.

8. The yaw brake lining according to claim 2, wherein the lubricant is at least one selected from the group consisting of low molecular weight polyolefin, stearyl alcohol, silicone and calcium stearate.

9. The yaw brake lining according to claim 1, wherein the coupling agent comprises γ-methacryloxy propyl trimethoxysilane and/or γ-2,3-Epoxypropoxy propyltrimethoxysilicane.

10. The yaw brake lining according to claim 2, wherein the coupling agent comprises γ-methacryloxy propyl trimethoxysilane and/or γ-2,3-Epoxypropoxy propyltrimethoxysilicane.

11. The yaw brake lining according to claim 1, wherein the antioxidant is at least one selected from the group consisting of pentaerythritol tetrakis [β-(3,5-di-tert-butyl-4-hydroxyphenyl) propionate] and β-(3,5-di-tert-butyl-4-hydroxyphenyl)propionic acid Octester.

12. The yaw brake lining according to claim 2, wherein the antioxidant is at least one selected from the group consisting of pentaerythritol tetrakis [β-(3,5-di-tert-butyl-4-hydroxyphenyl) propionate] and β-(3,5-di-tert-butyl-4-hydroxyphenyl)propionic acid Octester.

13. The yaw brake lining according to claim 11, wherein the yaw brake lining further comprises, by weight, 1-3 parts of brightening agent, and the brightening agent comprises titanium dioxide and/or calcium carbonate.

14. The yaw brake lining according to claim 12, wherein the yaw brake lining further comprises, by weight, 1-3 parts of brightening agent, and the brightening agent comprises titanium dioxide and/or calcium carbonate.

15. A method of producing the yaw brake lining according to claim 1, wherein the method comprises steps of:
   (a) mixing polyethylene terephthalate, polybutylene terephthalate, polytrimethylene terephthalate, glass fiber, anti-wear agent, lubricant, antioxidant, coupling agent and optional brightening agent to obtain an uniform mixture; and
   (b) performing injection molding on the mixture to produce the yaw brake lining.

16. The method of producing the yaw brake lining according to claim 15, wherein the yaw brake lining is mainly prepared from, by weight, the following ingredients: 42-48 parts of polyethylene terephthalate, 5-10 parts of polybutylene terephthalate, 5-10 parts of polytrimethylene terephthalate, 22-28 parts of glass fiber, 1-3 parts of anti-wear agent, 1-5 parts of lubricant, 1-3 parts of antioxidant and 1-3 parts of coupling agent.

17. The method of producing the yaw brake lining according to claim 15, wherein the anti-wear agent is at least one selected from the group consisting of molybdenum disulfide, graphite, ultra-high molecular weight polysiloxane, silicon nitride and boron nitride.

18. The method of producing the yaw brake lining according to claim 17, wherein the anti-wear agent is a mixture of molybdenum disulfide, graphite, silicon nitride and ultra-high molecular weight polysiloxane at a mass ratio of (1-2):(1-2):(1-2):(2-4).

19. The method of producing the yaw brake lining according to claim 15, wherein the lubricant is at least one selected from the group consisting of low molecular weight polyolefin, stearyl alcohol, silicone or calcium stearate.

20. The method of producing the yaw brake lining according to claim 15, wherein the method further comprises step (s), with the step (s) provided between the step (a) and the step (b), wherein in the step (s), the mixture is pelletized through extrusion to obtain mixture granules.

\* \* \* \* \*